United States Patent [19]
Saints et al.

[11] Patent Number: 5,872,775
[45] Date of Patent: Feb. 16, 1999

[54] METHOD AND APPARATUS FOR PERFORMING RATE DETERMINATION

[75] Inventors: Keith W. Saints; Edward G. Tiedemann, Jr., both of San Diego, Calif.

[73] Assignee: QUALCOMM Incorporated, San Diego, Calif.

[21] Appl. No.: 741,232

[22] Filed: Oct. 30, 1996

[51] Int. Cl.[6] .............................. H04B 7/216; H04J 3/22
[52] U.S. Cl. ......................... 370/342; 370/468; 455/67.1
[58] Field of Search ..................... 370/252, 332, 370/333, 335, 342, 441, 468; 455/522, 69, 67.1, 67.4; 375/200, 206, 225, 316

[56] References Cited

U.S. PATENT DOCUMENTS

| | | | |
|---|---|---|---|
| 4,748,626 | 5/1988 | Wong | 371/30 |
| 4,845,714 | 7/1989 | Zook | 371/50 |
| 5,023,889 | 6/1991 | Divsalar et al. | 375/27 |
| 5,056,117 | 10/1991 | Gitlin et al. | 375/102 |
| 5,208,816 | 5/1993 | Seshardi et al. | 371/43 |
| 5,396,516 | 3/1995 | Padovani et al. | 375/225 |
| 5,416,787 | 5/1995 | Kodama et al. | 371/43 |
| 5,548,808 | 8/1996 | Bruckert et al. | 455/436 |
| 5,689,511 | 11/1997 | Shimazaki et al. | 370/545 |

FOREIGN PATENT DOCUMENTS

| | | |
|---|---|---|
| 0413505 | 8/1990 | European Pat. Off. ....... H03M 13/12 |
| 0544315 | 11/1992 | European Pat. Off. ....... H03M 13/00 |
| 0713305 | 5/1996 | European Pat. Off. . |
| 9222161 | 12/1992 | WIPO . |
| 9501032 | 1/1995 | WIPO . |
| 9522217 | 8/1995 | WIPO . |

OTHER PUBLICATIONS

"Viterbi Decoding Algorithm for Convolutional Codes with Repeat Request" by Hirosuke Yamamoto et al.; *IEEE Transactions on Information Theory*, vol. IT–26 No. 26. pp. 540–547.

"Generalized Viterbi Algorithms for Error Detection with Convolutional Codes" by N. Seshadri et al.; *AT&T Bell Laboratories*, 1989 IEEE pp. 1534–1538.

"Combined Source and Channel Coding of Subband Coded Speech with Post–enhancement" by W.C. Wong et al.;*Communications Systems;Toward Global Integration*, Nov. 1990, vol. 2. 886–890.

*Primary Examiner*—Chi H. Pham
*Assistant Examiner*—Ricky Q. Ngo
*Attorney, Agent, or Firm*—Russell B. Miller; Bruce W. Greenhaus; Linli Golden

[57] ABSTRACT

A system and method for determining the transmission rate of a data signal at a receiver of a variable rate communications system. A vocoder at a transmitter encodes a frame of data into symbols according to one of a set of discrete data rates. When the data rate is lower than the maximum, each symbol is repeated a number of times as required to achieve a constant number of symbols in each frame. The data signal is transmitted at a power proportional to the data rate of the frame. A reference signal is also transmitted. The reference signal is transmitted at a constant power. Further, the data signal has the same carrier frequency as a reference signal so that they exhibit the same fading characteristics as they are transmitted through the channel. At a receiver, the power of the data signal and the power of reference signal are measured as received. The ratio of the power of the data signal to the power of the reference signal is compared with a predetermined ratio of the power of a maximum rate data signal to the power of the reference signal. The result of the comparison will indicate the encoded data rate of the received frame of data. The rate determined by the rate determination system is then used to properly decode the frame of data. A vocoder at the receiver further processes the data for interface with the user.

31 Claims, 5 Drawing Sheets

METHOD AND APPARATUS FOR PERFORMING RATE DETERMINATION

BACKGROUND OF THE INVENTION

I. Field of the Invention

The present invention relates to digital communications. More particularly, the present invention relates to a novel and improved system and method for determining, at a receiver of a variable rate communication system, the rate at which data has been encoded for transmission.

II. Description of the Related Art

The use of code division multiple access (CDMA) modulation techniques is one of several techniques for facilitating communications in which a large number of system users are present. Although other techniques such as time division multiple access (TDMA), frequency division multiple access (FDMA), and AM modulation schemes such as amplitude companded single sideband (ACSSB) are known, CDMA has significant advantages over these other techniques. The use of CDMA techniques in a multiple access communication system is disclosed in U.S. Pat. No. 4,901,307, entitled "SPREAD SPECTRUM MULTIPLE ACCESS COMMUNICATION SYSTEM USING SATELLITE OR TERRESTRIAL REPEATERS," assigned to the assignee of the present invention, the disclosure of which is incorporated by reference herein.

CDMA systems often employ a variable rate vocoder to encode data so that the data rate can be varied from one data frame to another. An exemplary embodiment of a variable rate vocoder is described in U.S. Pat. No. 5,414,796, entitled "VARIABLE RATE VOCODER," assigned to the assignee of the present invention, the disclosure of which is incorporated by reference herein. The use of a variable rate communications channel reduces mutual interference by eliminating unnecessary transmissions when there is no useful speech to be transmitted. Algorithms are utilized within the vocoder for generating a varying number of information bits in each frame in accordance with variations in speech activity. For example, a vocoder with a set of four rates may produce 20 millisecond data frames containing 16, 40, 80, or 171 information bits, depending on the activity of the speaker. It is desired to transmit each data frame in a fixed amount of time by varying the transmission rate of communications.

Additional details on the formatting of the vocoder data into data frames are described in U.S. Pat. No. 5,511,073, entitled "METHOD AND APPARATUS FOR THE FORMATTING OF DATA FOR TRANSMISSION," assigned to the assignee of the present invention, the disclosure of which is herein incorporated by reference. The data frames may be further processed, spread spectrum modulated, and transmitted as described in U.S. Pat. No. 5,103,459, entitled "SYSTEM AND METHOD FOR GENERATING WAVEFORMS IN A CDMA CELLULAR TELEPHONE SYSTEM," assigned to the assignee of the present invention, the disclosure of which is also incorporated by reference herein.

Variable rate systems can be developed which include explicit rate information. If the rate is included as part of a variable rate frame, then the rate is not recoverable until after the frame has already been properly decoded, at which point the rate has already been determined. Rather than including the rate in the variable rate frame, the rate could instead be sent in a non-variable rate portion of the frame. However, only a few bits are typically needed to represent the rate, and these bits cannot be efficiently encoded and interleaved in order to provide error protection for fading communications channels. Furthermore, the rate information is only available after some decoding delay or subject to error.

Alternatively, variable rate systems can be developed which do not include explicit rate information. One technique for the receiver to determine the rate of a received data frame where the rate information is not explicitly included in the frame is described in copending U.S. patent application Ser. No. 08/233,570, entitled "METHOD AND APPARATUS FOR DETERMINING DATA RATE OF TRANSMITTED VARIABLE RATE DATA IN A COMMUNICATIONS RECEIVER," filed Apr. 26, 1994 and assigned to the assignee of the present invention, the disclosure of which is herein incorporated by reference. Another technique is described in copending U.S. patent application Ser. No. 08/126,477, entitled "MULTIRATE SERIAL VITERBI DECODER FOR CODE DIVISION MULTIPLE ACCESS SYSTEM APPLICATIONS," filed Sep. 24, 1993 and assigned to the assignee of the present invention, the disclosure of which is herein incorporated by reference. According to these techniques, each received data frame is decoded at each of the possible rates. Error metrics, which describe the quality of the decoded symbols for each frame decoded at each rate, are provided to a processor. The error metrics may include Cyclic Redundancy Check (CRC) results, Yamamoto Quality Metrics, and Symbol Error Rates. These error metrics are well-known in communications systems. The processor analyzes the error metrics and determines the most probable rate at which the incoming symbols were transmitted.

Decoding each received data frame at each possible data rate will eventually generate the desired decoded data. However, the search through all possible rates is not the most efficient use of processing resources in a receiver. Also, as higher transmission rates are used, power consumption for determining the transmission rate also increases. This is because there are more bits per frame to be processed. Furthermore, as technology evolves, variable rate systems may utilize larger sets of data rates for communicating information. The use of larger sets of rates will make the exhaustive decoding at all possible rates infeasible. The decoding delay will not be tolerable for some system applications. Consequently, a more efficient rate determination system is needed in a variable rate communications environment. These problems and deficiencies are clearly felt in the art and are solved by the present invention in the manner described below.

SUMMARY OF THE INVENTION

The present invention is a novel and improved system and method for determining the transmission rate of communications in a variable rate communications system. Although the present invention may be used in many communications systems, it is particularly useful in cellular communication systems that use a variable rate vocoder for encoding and decoding speech at a plurality of discrete rates. Such communications systems include mobile telephone, personal communication devices, wireless local loop, and private branch exchange. The present invention is described in the context of a code division multiple access (CDMA) communication system but is equally applicable to other transmission formats.

The telecommunications industry association (TIA) has provided a standard for CDMA communications entitled IS-95-A Mobile Station—Base Station Compatibility Standard for Dual Mode Wideband Spread Spectrum Cellular System, hereinafter IS-95-A. IS-95-A provides for the transmission of variable rate data. The present invention is described herein for the transmission of multiplex option 1 data which provides for the transmission of data at 9600, 4800, 2400, and 1200 bits/sec referred to herein as full, half, quarter, and eighth rates respectively.

Transmission of data in IS-95-A compatible systems is provided in 20 millisecond frames. A full rate frame contains twice as many bits as a half rate frame which contains twice as many bits as a quarter rate frame which in turn contains twice as many bits as an eighth rate frame. On the IS-95-A forward link, symbol repetition is introduced to occupy the full capacity of the outgoing frames. So each symbol in a half rate frame is provided twice within the outgoing frame, each symbol in a quarter rate frame is provided four times and each symbol in an eighth rate frame is provided eight times.

Because a receiver can take advantage of the redundancy in the frame, frames transmitted at less than full rate are transmitted at lower energy than full rate frames. In the exemplary embodiment, half rate frames are transmitted at half the energy of the full rate frames, quarter rate frames are transmitted at one quarter the energy of full rate frames, and eighth rate frames are transmitted at one eighth the energy of full rate frames.

In addition to transmitting frames of data, the transmitter in a variable rate communications system also transmits a reference signal at approximately the same carrier frequency as the data signal. The reference signal is transmitted at a constant energy.

At a receiver, each received frame of data is compared with the reference signal. More particularly, the ratio of the power of the received data frame to the power of the reference signal is compared with a predetermined ratio of the power of a data frame encoded at the maximum rate to the power of the reference signal. Based on the relationship between the two ratios, the transmission rate of the received data frame can be determined prior to decoding. One use of the rate determination operation of the present invention is to provide a signal indicative of the transmission rate to the decoder for properly and efficiently decoding the received data frame.

BRIEF DESCRIPTION OF THE DRAWINGS

The features, objects, and advantages of the present invention will become more apparent from the detailed description set forth below when taken in conjunction with the drawings in which like reference characters identify correspondingly throughout and wherein.

DETAILED DESCRIPTION OF THE PREFERRED EMBODIMENTS

Figure 1:
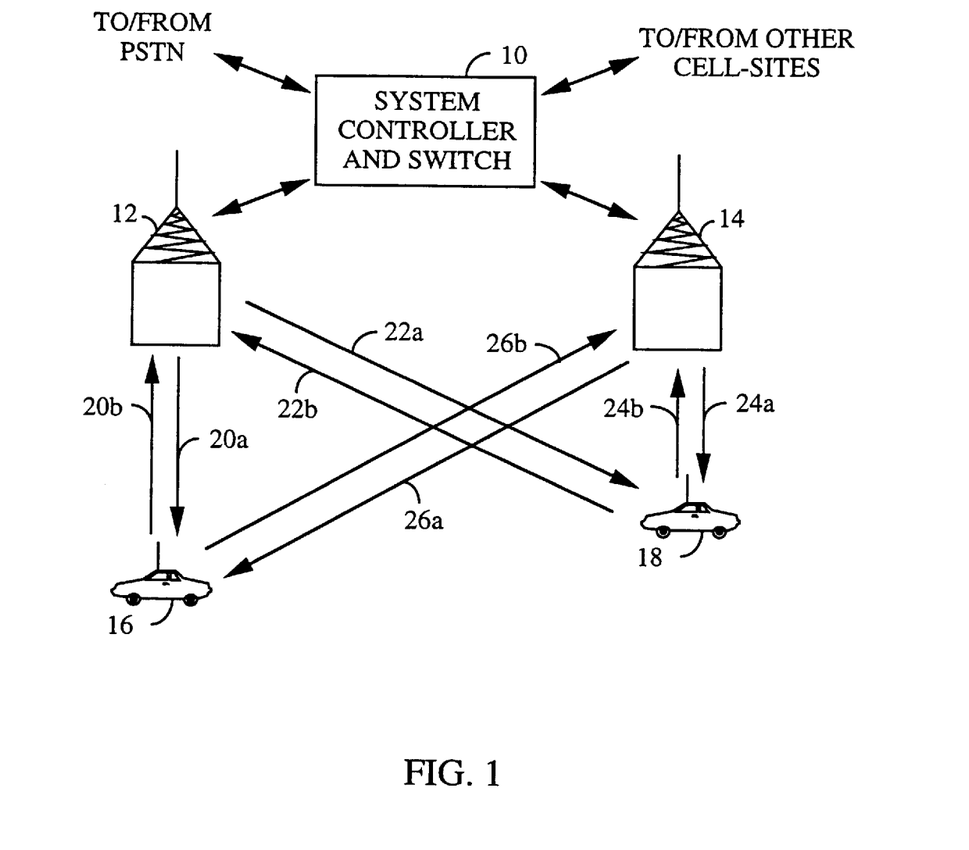
FIG. 1 is a schematic overview of an exemplary CDMA cellular telephone system.

An exemplary cellular mobile telephone system in which the present invention is embodied is illustrated in FIG. 1. For purposes of example this system is described herein within the context of a CDMA cellular communications system. However, it should be understood that the invention is applicable to other types of communication systems, such as personal communication systems (PCS), wireless local loop, private branch exchange (PBX) or other known systems. Furthermore, systems utilizing other well known transmission modulation schemes such as TDMA and FDMA as well as other spread spectrum systems may employ the present invention.

In FIG. 1, system controller and switch 10 typically include appropriate interface and processing hardware for providing system control information to the cell-sites. Controller 10 controls the routing of telephone calls from the public switched telephone network (PSTN) to the appropriate cell-site for transmission to the appropriate mobile unit. Controller 10 also controls the routing of calls from the mobile units via at least one cell-site to the PSTN. Controller 10 may direct calls between mobile users via the appropriate cell-site stations since such mobile units do not typically communicate directly with one another.

Controller 10 may be coupled to the cell-sites by various means such as dedicated telephone lines, optical fiber links or by radio frequency communications. In FIG. 1, two exemplary cell-sites, 12 and 14, along with two exemplary mobile units, 16 and 18, which include cellular telephones, are illustrated. Arrows 20a–20b and 22a–22b respectively define the possible communication links between cell-site 12 and mobile units 16 and 18. Similarly, arrows 24a–24b and arrows 26a–26b respectively define the possible communication links between cell-site 14 and mobile units 18 and 16.

The cellular system illustrated in FIG. 1 may employ a variable rate data channel for communications between cell-sites 12, 14 and mobile units 16, 18. By example, a vocoder (not shown) may encode sampled voice information into symbols at four different rates, such as approximately 8,550 bits per second (bps), 4,000 bps, 2,000 bps, and 800 bps, based on voice activity during a 20 millisecond (ms) frame of data. As described above in the IS-95-A standard, each frame of vocoder data is formatted with overhead bits as 9,600 bps, 4,800 bps, 2,400 bps, and 1,200 bps data frames. As mentioned above, the highest rate data frame which corresponds to a 9,600 bps frame is referred to as a full rate frame; the 4,800 bps data frame is referred to as a half rate frame; a 2,400 bps data frame is referred to as a quarter rate frame; and a 1,200 bps data frame is referred to as an eighth rate frame. Although this example describes a set of four data rates, it should be understood that a different number of variable rates may be utilized instead.

Figure 2A:
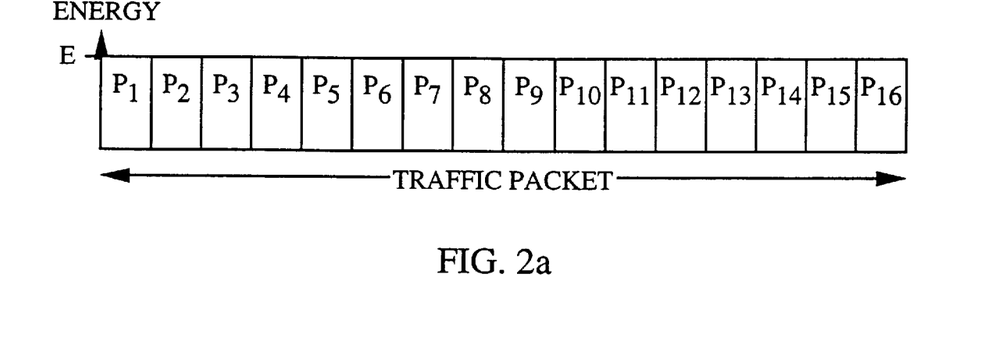
FIGS. 2a–2d illustrate, in a series of graphs, exemplary energy levels of the data frames at full, half, quarter, and eighth rates.
Figure 2B:
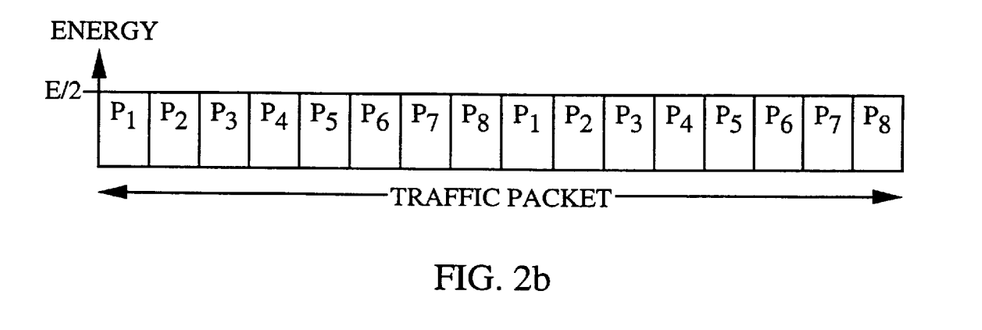
Figure 2C:
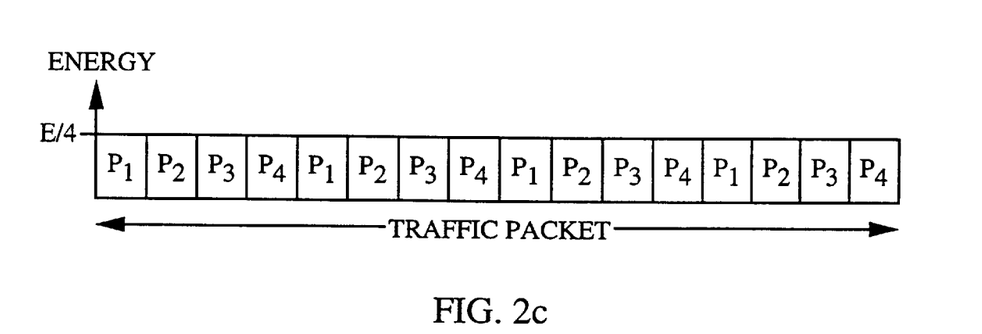
Figure 2D:
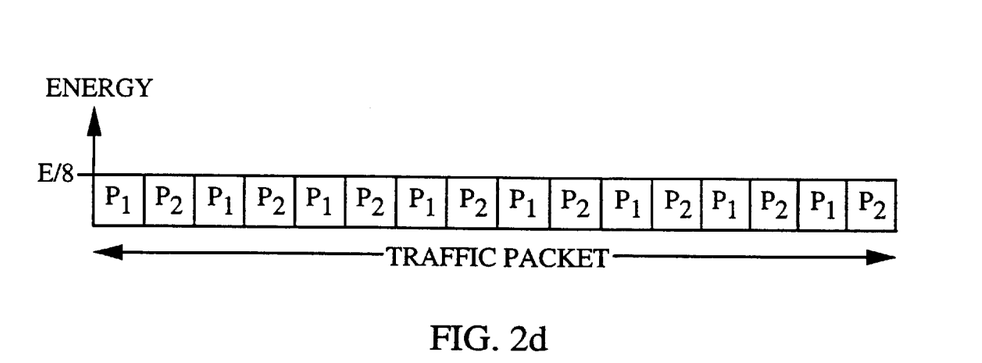

Additional features of the variable rate data frames in a system utilizing a set of four rates are illustrated in FIGS. 2a–2d. As shown in FIGS. 2a–2d, the energy in a data frame is varied as the data rate of the data signal is varied. Further, when the data rate is lower than the maximum, in addition to lowering the energy, each data symbol in a frame is repeated a number of times as required to achieve a constant number of symbols in each frame to be transmitted. In FIG. 2a, a data frame, designated as a traffic packet, is shown to be encoded by symbols $P_1$–$P_{16}$. The data frame of FIG. 2a has been encoded at full rate has the highest energy with no repetition of symbols. FIG. 2b shows that a half rate data frame has half of the highest energy with each symbol ($P_1$–$P_8$) repeated two times. FIG. 2c shows that a quarter rate data frame has a quarter of the highest energy with each symbol ($P_1$–$P_4$) repeated four times. FIG. 2d shows that an eighth rate data frame has an eighth of the highest energy with each symbol ($P_1$–$P_2$) repeated eight times. Although FIGS. 2a–2d show that the fraction of energy is the same as the fraction of data symbols in a frame, it should be understood that different fractions of energy may be used instead.

In addition to encoding with data symbols, the data frames are formatted with overhead bits, which generally will include additional bits for error correction and detection, such as Cyclic Redundancy Check (CRC) bits. The CRC bits can be used by the decoder to determine whether or not a frame of data has been received correctly. CRC codes are produced by dividing the data block by a predetermined binary polynomial as is described in detail in IS-95-A. Other methods of detecting whether a frame has been properly received include the Yamamoto Quality Metrics and the Symbol Error Rate. The Yamamoto metric is determined by comparing the differences in the metrics of remerging paths in each step of the Viterbi decoding with a threshold and labeling a path as unreliable if the metric difference is less than a quality threshold. If the final path selected by the Viterbi decoder has been labeled as unreliable at any step, the decoder output is labeled as unreliable. Otherwise, it is labeled as reliable. The Symbol Error Rate is determined by taking the decoded bits, re-encoding these bits to provide re-encoded symbols and comparing these re-encoded symbols against hard decision received symbols. The Symbol Error Rate is a measure of the mismatching between the re-encoded symbols and the received symbols.

The formatted data frames undergo further processing, which include frequency upconversion to the radio frequency (RF) frequency band and amplification of the signals of data frames, before transmission.

When signals of the variable rate data frames are received by a mobile unit, such as mobile unit 16 or 18 of FIG. 1, the mobile unit must determine the rate of transmission in order to properly decode the signals. However, the rate of the received frame is not known by the mobile station a priori. Further, it is not possible to determine the rate by looking at the absolute power of the received signal, even though the power is proportional to the rate of transmission. This is because of changes in the propagation path, such as fading and blocking. Fading occurs because a transmitted signal is reflected from many different features of the physical environment. Consequently, a signal arrives at the receiver of a mobile unit with multiple reflected components. At the UHF frequency bands usually employed for mobile radio communications, including those of cellular mobile telephone systems, significant phase differences in signals traveling on different paths may occur. The out-of-phase components may add destructively, greatly reducing the received signal power. Fading is explained in more depth in U.S. Pat. Nos. 4,901,307 and 5,103,459 mentioned above. Blocking occurs because of a physical obstacle entering the line of sight propagation path.

Even though it is not possible to determine the encoded rate of the data frames by looking at the absolute power of the received data signal, the rate can be determined if the fading characteristics are known. The present invention performs rate determination by comparing the power of a data signal with the power of a reference signal transmitted from the same source. The reference should be a signal which is transmitted at a fairly constant power at all times. Further, since fading is frequency dependent, the reference signal should be transmitted at approximately the same frequency as the data signal. This way, the data and reference signals will exhibit similar fading characteristics, and the rate of the data signal can be determined in accordance with the power of the data signal relative to the power of the reference signal.

In a preferred embodiment, the reference signal comprises a pilot signal as described in the previously mentioned patents U.S. Pat. Nos. 4,901,307 and 5,103,459. The use of a pilot signal in CDMA systems is well known. As disclosed in the aforementioned patents, a pilot carrier signal is used to provide a coherent phase reference for a communications link. In a CDMA cellular system, each cell or sector transmits a pilot signal of the same spreading code but with a different code phase offset. The phase offset allows the pilot signals to be distinguished from one another thus distinguishing originating cell-sites or sectors. Use of the same pilot signal code allows the mobile unit to find system timing synchronization by a single search through all pilot signal code phases. A pilot signal is also used as a time reference for demodulation of the digital speech signals transmitted by a particular cell-site.

Figure 3:
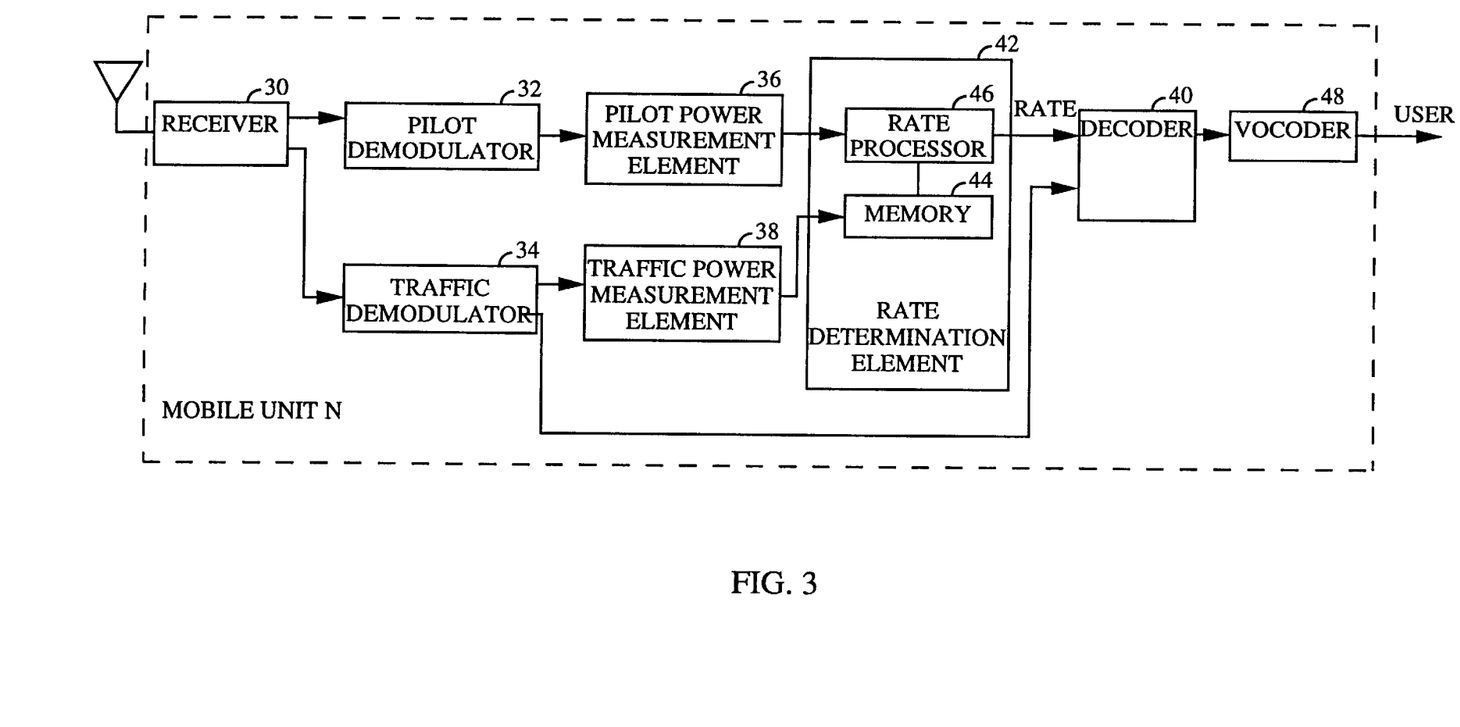
FIG. 3 is a block diagram of a variable rate receiving system with particular reference to the rate determination features of the present invention.

Referring now to FIG. 3, an exemplary receiving system for receiving variable rate communications is illustrated. In a CDMA environment, for example, the receiving system of FIG. 3 may be implemented in a mobile unit in order to determine the data rate of signals transmitted from a cell-site. The present invention offers particular advantages in a mobile station because by determining the rate in advance of decoding, the exhaustive decoding at all rates can be avoided. This reduces power consumption in the decoding process which can extend battery life in the receiver. Also, the speed of rate determination is improved.

For purposes of discussing FIG. 3, the mobile unit in which the rate determination system is implemented will be referred to as mobile unit N, where mobile unit N may be illustrated by either mobile units 16 or 18 of FIG. 1. Variable rate data is transmitted to mobile unit N from system controller and switch 10 via one or more cell-sites. The cell-sites will be referred to as cell-site N' and are illustrated by either cell-sites 12 or 14 in FIG. 1. Although it is shown in FIG. 3 that the rate determination system is part of mobile unit N, it should be understood that the rate determination system may instead be implemented in a cell-site to determine the data rate of signals transmitted from a mobile unit. In addition, the rate determination system may also be utilized in other communications systems.

The variable rate receiving system illustrated in FIG. 3 includes receiver 30 for collecting cell-site transmitted signals. Signals received by receiver 30 include RF signals of the pilot and data signals transmitted by cell-site N'. Receiver 30 amplifies and frequency downconverts the received signals from the RF frequency band to the intermediate frequency (IF) band.

The IF signals are presented to pilot demodulator 32 and traffic demodulator 34. The design and implementation of demodulators 32 and 34 are described in detail in U.S. Pat. No. 5,490,165, entitled "DEMODULATION ELEMENT ASSIGNMENT IN A SYSTEM CAPABLE OF RECEIVING MULTIPLE SIGNALS," assigned to the assignee of the present invention, the disclosure of which is incorporated by reference herein. Pilot demodulator 32 demodulates the IF signal to produce the pilot signal transmitted by cell-site N', and presents the pilot signal to pilot power measurement element 36. Traffic demodulator 34 demodulates the IF signal to produce the data, or traffic, signal consisting of the symbols of one frame of data transmitted by cell-site N'. Traffic demodulator 34 generates the data signal by despreading and correlating the IF signal with the pilot signal which identifies cell-site N'. The data signal generated by traffic demodulator 34 is presented to traffic power measurement element 38. The data signal is also presented to decoder 40.

In the exemplary embodiment, decoder 40 is a trellis decoder capable of decoding data of varying rates, such as a Viterbi decoder. The design and implementation of a multirate Viterbi decoder which exhaustively decodes a received signal at all rates of a set of rates is described in the aforementioned U.S. patent applications Ser. Nos. 08/126,477 and 08/233,570. It will be understood by one skilled in the art that the multirate Viterbi decoder may be modified to decode at a selected rate. This may be accomplished by having the Viterbi decoder receive a rate indicator input, in response to which the decoder decodes the data signal according to the rate indicator.

Pilot power measurement element 36 and traffic power measurement element 38 measure, respectively, the power of the demodulated pilot signal and the demodulated traffic signal. Signals of the power levels are presented to rate determination element 42.

For purposes of this discussion, rate determination element 42 is described to determine the data rate where a set of four possible rates are used. It should be understood that rate determination element 42 may be modified to accommodate a different number of possible data rates. A further modification would allow rate determination element 42 to first select a subset of data rates from the set of all possible rates, then to determine the correct data rate from the subset of data rates.

Rate determination element 42 comprises memory 44 and rate processor 46. Memory 44 stores a reference ratio of the power of a full-rate frame transmitted by cell-site N' to the power of the pilot signal transmitted by cell-site N' ($P_{full-rate}/P_{pilot}$). Memory 44 may also store reference ratios of the power of half-rate, quarter-rate, and eighth-rate frames to the power of a full-rate frame ($P_{half-rate}/P_{pilot}$, $P_{quarter-rate}/P_{pilot}$, $P_{eighth-rate}/P_{pilot}$). The latter three ratios will be especially useful where the transmitted power of the half-rate, quarter-rate, and eighth rate frames are not exactly ½, ¼, and ⅛, respectively, of the power of a full-rate frame.

In a preferred embodiment, upon establishment of a link between mobile unit N and cell-site N', cell-site N' transmits an initial ratio of full-rate frame power to pilot power, and this initial ratio is stored in memory 44 as the full-rate reference ratio. Cell-site N' may also transmit initial ratios of half-rate, quarter-rate, and eighth-rate frame powers to pilot power, and these ratios are stored in memory 44 as half-rate, quarter-rate, and eighth-rate reference ratios, respectively.

Rate processor 46 receives the signals indicating the power levels of the demodulated pilot signal and the demodulated data signal. For each frame of received data signal, also called traffic signal, rate processor 46 computes a frame ratio of the power of the data signal to the power of the pilot signal ($P_{traffic}/P_{pilot}$). Rate processor 46 then compares the frame ratio $P_{traffic}/P_{pilot}$ with the full-rate reference ratio $P_{full-rate}/P_{pilot}$. Where the half-rate, quarter-rate, and eighth-rate reference ratios are also available, the frame ratio is also compared with these. If the frame ratio is equal to the reference ratio, processor 46 will conclude that a full rate frame of data has been received, and present a signal indicative of a full rate to decoder 40. Likewise, if the frame ratio is of a proportion indicative of a half-rate, quarter-rate, or eighth-rate frame, a signal indicative of the chosen rate will be provided to decoder 40.

It should be understood that instead of defining the reference ratio to be $P_{full-rate}/P_{pilot}$, the reference ratio may instead be $P_{pilot}/P_{full-rate}$. Where the reference ratio is $P_{pilot}/P_{full-rate}$, rate processor 46 will compute the frame ratio to be the power of the pilot signal to the power of the data signal, $P_{pilot}/P_{traffic}$. The frame ratio can again be compared with the reference ratio to estimate the frame rate, which is then provided to decoder 40.

Decoder 40 receives the demodulated data frame and a signal indicating the estimated data rate of the frame as provided by rate determination element 42. Decoder 40 performs decoding and error correction on the demodulated data frame. The demodulated data frame consisting of data symbols is decoded at the rate provided by rate determination element 42 to produce information bits. Further, error metrics, which may include the Cyclic Redundancy Code bits, the Yamamoto Quality Metric, and Symbol Error Rate, are generated. The error metrics will indicate the quality of the frame of information bits.

If the error metrics indicate that the data symbols have been properly decoded into information bits, decoder 40 will provide a signal of the information bits to variable rate vocoder 48. However, if the error metrics indicate that the data symbols have not been properly decoded into information bits, then decoder 40 will exhaustively decode the demodulated data at all rates in order to determine the most probable data rate. Methods for exhaustive decoding at all rates are described in U.S. patent applications Ser. Nos. 08/233,570 and 08/126,477. Then, a signal of decoded information bits corresponding to the most probable data rate is provided to variable rate vocoder 48. Upon receipt of the signal of information bits, variable rate vocoder 48 further processes the information bits for interface with the user.

Figure 4:
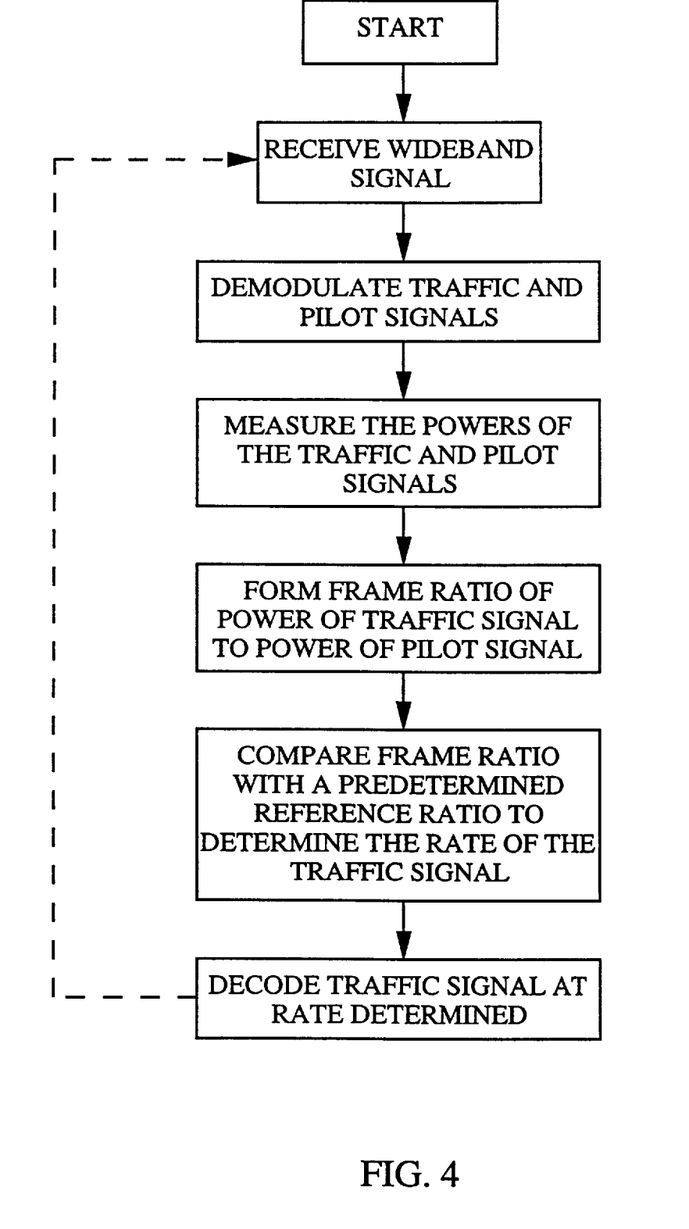
FIG. 4 is a flow chart illustrating an exemplary embodiment of the processing steps involved in rate determination as performed by the processing elements of FIG. 3.

A brief illustration of the steps involved in rate determination as described in the embodiment above is shown in FIG. 4. FIG. 4 shows in block diagram form a flow chart illustrating some of the steps involved in the processing as discussed with reference to FIG. 3.

In an alternate embodiment, instead of having rate processor 44 generate just one signal indicative of the rate determined by rate determination element 42, processor 44 may instead rank the possible rates in descending order of probability. The ranking is provided to decoder 40. Decoder 40 then decodes the signal of data symbols according to the highest ranked rate, and generates error metrics for the decoded bits. If the error metrics indicate a successful decoding, then the information bits are provided to vocoder 48. Otherwise, the signal of data symbols is sequentially decoded at the other rates according to the ranking, and error metrics are generated for each decoding. Once the error metrics indicate high quality, no further decoding is necessary.

In another embodiment, rate determination system 42 is implemented in conjunction with a different rate determination system to provide an additional metric on which to base a decision on the rate of a received frame. For example, rate determination system 42 may be used in conjunction with the exhaustive decoding method as described in U.S. patent applications Ser. Nos. 08/233,570 and 08/126,477. This is especially useful where a very accurate rate determination is necessary.

The above description of the rate determination system assumes that the ratio of the full rate traffic channel power to pilot channel power remains constant for the duration of the communications link. However, in a CDMA system, a cell-site may adjust the power of its transmitted signals in response to power adjustment requests from mobile units. The adjustments are made to maintain the quality of the communications link. In one embodiment of a CDMA system, a mobile unit may compare the power of a signal received from a particular cell-site with the interference and noise power. In situations where the signal-to-interference ratio deviates from the ideal, the mobile unit may transmit a request to the cell-site for adjustments in the power of cell-site transmissions. Further details on power control is disclosed in U.S. Pat. No. 5,485,486, entitled "METHOD AND APPARATUS FOR CONTROLLING TRANSMISSION POWER IN A CDMA CELLULAR MOBILE TELEPHONE SYSTEM," assigned to the assignee of the present invention, the disclosure of which is incorporated by reference herein.

When a cell-site adjusts the power of its transmitted signals, rate determination element 42 of FIG. 3 will be updated by adjusting the value of the reference ratio $P_{full-rate}/P_{pilot}$ stored in memory 44. Recall that this is the ratio of power of pilot signal to power of full-rate traffic signal. In systems which utilize additional reference ratios $P_{half-rate}/P_{pilot}$, $P_{quarter-rate}/P_{pilot}$, and $P_{eighth-rate}/P_{pilot}$, these ratios are also adjusted accordingly. In an improved embodiment of the rate determination system of the present invention, the mobile unit tracks the power control requests that it sends to the cell-sites. Signals indicative of the power control requests are relayed to rate processor 46 of rate determination element 42. Based on the power control requests, rate processor 46 will estimate an updated reference ratio $P_{full-rate}/P_{pilot}$ and present the updated value to memory 44 for storage. Similarly, rate processor 46 may also estimate updated reference ratios $P_{half-rate}/P_{pilot}$, $P_{quarter-rate}/P_{pilot}$, and $P_{eighth-rate}/P_{pilot}$. Subsequent rate determination of data frames will be performed based on the updated reference ratio or ratios.

It should be understood that the receiving system illustrated in FIG. 3 need not determine the rate of a received frame just once per frame. The system described above is capable of measuring the power of a received signal several times during the time frame. Traffic power measurement element 38 may be set to accumulate the power measurements from the beginning of the frame to the end of the frame. Thus, traffic power measurement 38 will compute a new average of power measurements each time a new power measurement is made for the traffic frame. Likewise, pilot power measurement element 36 may accumulate the power measurements for the pilot signal during the duration of the data frame. Then, at any moment during the frame, $P_{traffic}/P_{pilot}$ can be computed to get the best estimate based on the portion of the data frame that has been received up to that moment. Based on $P_{traffic}/P_{pilot}$ the data rate for the traffic frame can be determined at any moment. This is important for applications which require very fast rate determination. For example, a power control scheme which measures the strength of the data signal several times during the frame needs to know the actual frame rate in order to evaluate the quality of the communications link. A drop in the power of the data signal may be due to either fading or a lower data rate. This needs to be determined before power control commands are sent out.

In a further improved embodiment of the rate determination system of the present invention, the cell-site keeps track of the power of its transmitted pilot signal relative to the power of its full-rate traffic signal. The cell-site then intermittently transmits a signal of the estimated ratio $P_{full-rate}/P_{pilot}$, indicating the relative power of the transmitted signals. The signal of the ratio is received by the mobile unit. Referring still to FIG. 3, rate processor 46 of rate determination element 42 obtains the reference ratio, and compares the value of the newly received ratio with the value of the reference ratio retrieved from memory 44. If the reference ratio is different from the newly received ratio, the reference ratio will be updated by the newly received ratio. The updated reference ratio is then utilized for rate determination of subsequently received data frames. In addition to transmitting $P_{full-rate}/P_{pilot}$, the cell-site may also intermittently transmit signals of the estimated ratios $P_{half-rate}/P_{pilot}$, $P_{quarter-rate}/P_{pilot}$, and $P_{eighth-rate}/P_{pilot}$. In this case, the additional ratios will also be compared with reference ratios stored in memory 44, and the reference ratios will be updated if necessary.

Figure 5:
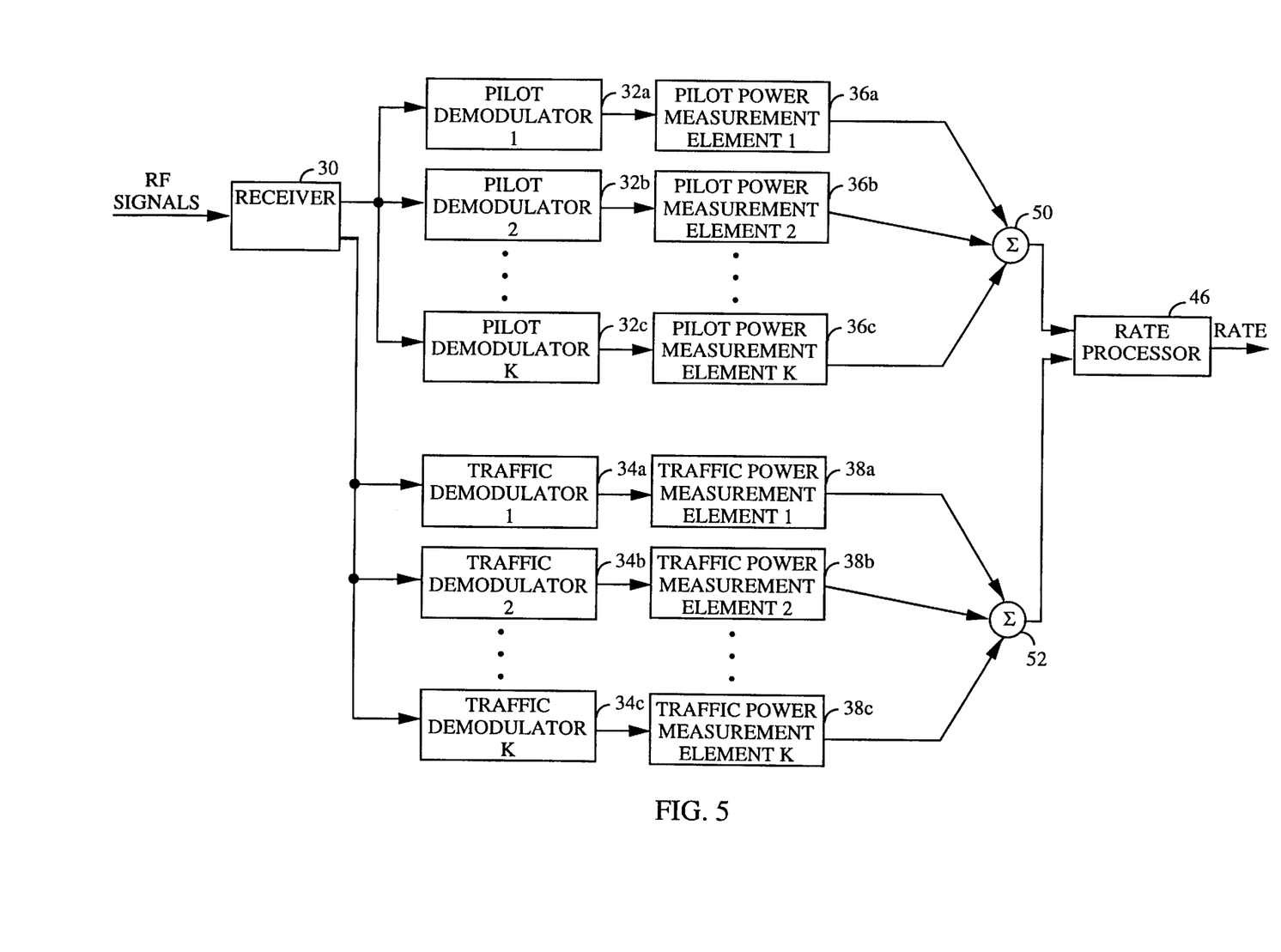
FIG. 5 is a block diagram illustrating the elements of the variable rate receiving system wherein a RAKE receiver is employed.

In still another embodiment of the present invention, a RAKE receiver is employed in a receiving system which performs rate determination. A RAKE receiver demodulates multiple pilot and traffic signals, as described in U.S. Pat. No. 5,109,390, entitled "DIVERSITY RECEIVER IN A CDMA CELLULAR TELEPHONE SYSTEM," assigned to the assignee of the present invention and incorporated by reference. FIG. 5 illustrates the use of a RAKE receiver. In FIG. 5, receiver 30 collects cell-site transmitted RF signals, and amplifies and frequency downconverts them to produce IF signals. Instead of presenting the IF signals to one pilot demodulator 32 and one traffic demodulator 34 as shown in FIG. 3, the IF signals are presented to a plurality of k pilot demodulators, represented by pilot demodulators 32a–32c of FIG. 5, and a plurality of k traffic demodulators, represented by traffic demodulators 34a–34c of FIG. 5.

The system of FIG. 5 may be implemented in a mobile unit. In a mobile unit, the k pilot demodulators 32a–32c will be capable of demodulating multiple pilot signals, which may correspond to transmissions via more than one transmission path from a given cell-site, or transmitted from more than one cell-site. Likewise, the k traffic demodulators 34a–34c will be capable of demodulating traffic signals transmitted via more than one transmission path from a given cell-site or transmitted from more than one cell-site. The k traffic demodulators are configured to receive the multiple transmissions of the same source traffic signal, and the k pilot demodulators demodulate the pilot signals corresponding to the multiple transmissions of the source traffic signal.

The demodulated pilot signals generated by pilot demodulators 32a–32c are presented to corresponding pilot power measurement elements 36a–36c, which measure the powers of the demodulated pilot signals. Signals of the measured powers of the pilot signals are presented to summer 50, which computes the sum of the powers of the pilot signals. Although a plurality of k pilot power measurement elements 36a–36c are shown, it should be understood that a single pilot power measurement element may receive all demodulated pilot signals, measure the power of each signal, and sum the powers. A signal of the sum is presented to rate processor 46, which processes the signal as described above.

The demodulated traffic signals generated by traffic demodulators 34a–34c are likewise presented to corresponding traffic power measurement elements 38a–38c, which measure the powers of the demodulated traffic signals. Signals of the measured powers of the traffic signals are presented to summer 52, which computes the sum of the powers of the traffic signals. As in the case for the pilot signals, it should be understood that a single traffic power measurement element may receive all demodulated traffic signals, measure the power of each traffic signal, and sum the powers. A signal of the sum of the traffic signal powers is also presented to rate processor 46. Having received the sum of the pilot signal powers and the sum of the traffic signal powers, rate processor 46 determines the rate of the traffic signal as described above.

The previous description of the preferred embodiments is provided to enable any person skilled in the art to make or use the present invention. The various modifications to these embodiments will be readily apparent to those skilled in the art, and the generic principles defined herein may be applied to other embodiments without the use of the inventive faculty. Thus, the present invention is not intended to be limited to the embodiments shown herein but is to be accorded the widest scope consistent with the principles and novel features disclosed herein.

I claim:

1. In a variable rate communications system, a system for determining, at a receiver, the data rate of a received traffic signal, comprising:

means for measuring the power of said traffic signal, and for providing a signal indicative of said measured traffic power;

means for measuring the power of a pilot signal, and for providing a signal indicative of said measured pilot power; and rate determination means for receiving said traffic power signal and said pilot power signal, determining the data rate of said traffic signal in accordance with a ratio of said traffic power signal and said pilot power signal, and providing a selected data rate for said traffic signal.

2. The rate determination system of claim 1 wherein said rate determination means comprises:

memory means for storing a reference ratio of the power of a full-rate traffic signal and the power of said pilot signal; and rate processor means for generating a frame ratio of said traffic power signal and said pilot power signal and comparing said frame ratio with said reference ratio in order to determine the data rate of said traffic signal.

3. The rate determination system of claim 1 further comprising decoder means for decoding said traffic signal based on said selected data rate to generate a decoded traffic signal.

4. The rate determination system of claim 3 wherein said decoder means further generates error metrics indicative of the quality of said decoded traffic signal.

5. The rate determination system of claims 4 wherein said decoder means further decodes said traffic signal based on at least one non-selected transmission rate, said further decoding to be performed upon generation of a negative indication of said error metrics.

6. The rate determination system of claim 1 further comprising CDMA receiver means for receiving said traffic signal and said pilot signal.

7. The rate determination system of claim 2, wherein said memory means further stores additional reference ratios of the powers of traffic signals at rates less than full-rate and the power of said pilot signal; and wherein said rate processor means further compares said frame ratio with said additional reference ratios in order to determine the data rate of said traffic signal.

8. The rate determination system of claim 2 wherein said rate processor means is further for tracking power control requests sent from said receiver to a transmitter and adjusting said reference ratio stored in said memory means in response to said power control requests.

9. The rate determination system of claim 2 further comprising:

receiver means for intermittently receiving a signal indicative of an updated ratio of the power of a traffic signal transmitted at full-rate to the power of said pilot signal; and wherein said rate processor means is further for replacing said reference ratio stored in said memory means with said updated ratio.

10. The rate determination system of claim 8 further comprising:

receiver means for intermittently receiving a signal indicative of an updated ratio of the power of a traffic signal transmitted at full-rate to the power of said pilot signal; and wherein said rate processor means is further for replacing said reference ratio stored in said memory means with said updated ratio.

11. The rate determination system of claim 1, wherein said means for measuring the power of said traffic signal measures the power of said traffic signal several times during a received data frame and obtains an average of the power of said traffic signal each time the power of said traffic signal is measured;

wherein said means for measuring the power of said pilot signal measures the power of said pilot signal several times during said received data frame and obtains an average of the power of said pilot signal each time the power of said pilot signal is measured; and wherein said rate determination means determines the data rate of said traffic signal in accordance with a ratio of said average of the power of said traffic signal and said average of the power of said pilot signal.

12. A receiving system for variable rate communications, comprising:

a receiver for receiving a wide-band signal;

a demodulator for demodulating said wide-band signal to produce a traffic signal and a pilot signal, wherein said traffic signal has been transmitted at one of a set of possible transmission rates, and wherein said pilot signal has been transmitted at a constant power and has the same carrier frequency as said traffic signal;

power measurement means for measuring the power of said traffic signal and the power of said pilot signal;

rate determination means for determining the data rate of said traffic signal in accordance with a ratio of said traffic power signal and said pilot power signal in order to provide a selected data rate for said traffic signal; and decoder means for decoding said traffic signal in accordance with said selected data rate.

13. The receiving system of claim 12 wherein said rate determination means comprises:

memory means for storing a reference ratio of the power of a full-rate traffic signal and the power of said pilot signal;

rate processor means for generating a frame ratio of the power of said traffic signal and the power of said pilot signal and comparing said frame ratio with said reference ratio in order to determine the data rate of said traffic signal.

14. The receiving system of claim 12 wherein said demodulator is a CDMA demodulator.

15. A method for determining, at a receiver of a variable rate communications system, the data rate of a received traffic signal, comprising the steps of:

measuring the power of a traffic signal in order to provide a signal indicative of said measured traffic power;

measuring the power of a pilot signal in order to provide a signal indicative of said measured pilot power; and determining the data rate of said traffic signal in accordance with a ratio of said traffic power signal and said pilot power signal to provide a selected data rate.

16. The method of claim 15 wherein said step of determining the data rate comprises the steps of:

storing in a memory a reference ratio of the power of a full-rate traffic signal and the power of said pilot signal;

generating a frame ratio of said traffic signal power and said pilot signal power; and comparing said frame ratio with said reference ratio in order to determine said data rate for said traffic signal.

17. The method of claim 15 further comprising the step of decoding said traffic signal based on said selected data rate to produce a decoded traffic signal.

18. The method of claim 17 further comprising the step of generating error metrics indicative of the quality of said decoded traffic signal.

19. The method of claim 18 further comprising the step of decoding said traffic signal based on at least one non-selected data rate, said further decoding to be performed upon generation of a negative indication of said error metrics.

20. The method of claim 16 further comprising the steps of:

storing in said memory additional reference ratios of the powers of traffic signals at less than full-rate and the power of said pilot signal; and comparing said frame ratio with said additional reference ratios in order to determine said data rate for said traffic signal.

21. The method of claim 16 further comprising the steps of:

tracking power control requests sent from said receiver to a transmitter; and adjusting said reference ratio stored in said memory in response to said power control requests.

22. The method of claim 16 further comprising the steps of:

intermittently receiving a signal indicative of an updated reference ratio of the power of a traffic signal transmitted at full-rate and the power of said pilot signal; and replacing said reference ratio stored in said memory with said updated ratio if said reference ratio is different from said updated ratio.

23. The method of claim 21 further comprising the steps of:

intermittently receiving a signal indicative of an updated reference ratio of the power of a traffic signal transmitted at full-rate to the power of said pilot signal; and replacing said reference ratio stored in said memory with said updated ratio if said reference ratio is different from said updated ratio.

24. The method of claim 15 wherein said step of determining said data rate of said traffic signal comprises:

measuring the power of said traffic signal and the power of said pilot signal several times during a received data frame;

computing an average of the power of said traffic signal and an average of the power of said pilot signal each time the power of said traffic signal and the power of said pilot signal are measured during said received data frame; and determining said data rate in accordance with a ratio of said average of the power of said traffic signal and said average of the power of said pilot signal.

25. In a variable rate communications system, an apparatus for determining, at a receiver, the data rate of a received traffic signal, comprising:

a pilot power measurer having an input for receiving a pilot signal and an output for providing a signal indicative of the power of said pilot signal;

a traffic power measurer having an input for receiving a traffic signal and an output for providing a signal indicative of the power of said traffic signal; and a rate processor having a first input coupled to said pilot power measurer output for receiving said signal indicative of the power of said pilot signal a second input coupled to said traffic power measurer output for receiving said signal indicative of the power of said traffic signal, and an output for providing a rate for said traffic signal, said rate determined based on a ratio of said power of said pilot signal and said power of said traffic signal.

26. In a variable rate communications system, a system for determining the data rate of received traffic signals, comprising:

means for measuring the power of each of a plurality of received pilot signals, said received pilot signals transmitted via a plurality of transmission paths from at least one transmitter;

means for determining a summed pilot power measurement of the power of said pilot signals;

means for measuring the power of each of a plurality of received traffic signals, said received traffic signals transmitted via a plurality of transmission paths from said at least one transmitter;

means for determining a summed traffic power measurement of the power of said traffic signals; and means for determining a selected data rate for said traffic signals in accordance with a ratio of said summed pilot power measurement and said summed traffic power measurement.

27. The rate determination system of claim 26 wherein said means for determining a selected data rate comprises:

memory means for storing a reference ratio of the power of full-rate traffic signals and the power of said pilot signals; and rate processor means for generating a frame ratio of said summed traffic power measurement and said summed pilot power measurement, and comparing said frame ratio with said reference ratio in order to determine said selected data rate for said traffic signals.

28. The rate determination system of claim 27, wherein said memory means further stores additional reference ratios of the power of traffic signals at rates less than full-rate and the power of said pilot signals; and wherein said rate processor means further compares said frame ratio with said additional reference ratios in order to determine said selected data rate for said traffic signals.

29. The rate determination system of claim 27 wherein said rate processor means is further for tracking power control requests sent to said at least one transmitter and for adjusting said reference ratio stored in said memory means based on said power control requests.

30. The rate determination system of claim 27, further comprising:

receiver means for intermittently receiving a signal indicative of an updated ratio of the power of said traffic signals transmitted at full-rate to the power of said pilot signals; and wherein said rate processor means is further for replacing said reference ratio stored in said memory means with said updated ratio.

31. The rate determination system of claim 29, further comprising:

receiver means for intermittently receiving a signal indicative of an updated ratio of the power of said traffic signals transmitted at full-rate to the power of said pilot signals; and wherein said rate processor means is further for replacing said reference ratio stored in said memory means with said updated ratio.

\* \* \* \* \*